United States Patent
Stephens (10) Patent No.: US 7,315,275 B2
(45) Date of Patent: Jan. 1, 2008

(54) POSITIONING SYSTEM WITH INTENTIONAL MULTI-PATH SIGNAL

(75) Inventor: Scott Adam Stephens, Phoenix, AZ (US)

(73) Assignee: Navcom Technology, Inc., Torrance, CA (US)

( * ) Notice: Subject to any disclaimer, the term of this patent is extended or adjusted under 35 U.S.C. 154(b) by 326 days.

(21) Appl. No.: 11/103,950

(22) Filed: Apr. 11, 2005

(65) Prior Publication Data
US 2005/0270227 A1 Dec. 8, 2005

Related U.S. Application Data

(63) Continuation-in-part of application No. 10/614,097, filed on Jul. 3, 2003, now Pat. No. 7,250,901.

(51) Int. Cl.
*G01S 13/08* (2006.01)
*H01Q 15/00* (2006.01)

(52) U.S. Cl. .......................... 342/146; 342/5; 342/126; 342/188

(58) Field of Classification Search .............. 342/5–10, 342/8, 126, 146, 450, 457, 361–365; 333/21 R; 343/756
See application file for complete search history.

(56) References Cited

U.S. PATENT DOCUMENTS

| | | | |
|---|---|---|---|
| 4,104,634 A | 8/1978 | Gillard et al. | |
| 4,315,609 A * | 2/1982 | McLean et al. | 244/3.14 |
| 4,398,198 A | 8/1983 | Dano et al. | 343/103 |
| 4,636,795 A | 1/1987 | Dano | 342/387 |
| 4,700,306 A | 10/1987 | Wallmander | 364/449 |
| 4,710,020 A | 12/1987 | Maddox et al. | |
| 4,829,442 A | 5/1989 | Kadonoff et al. | |

(Continued)

FOREIGN PATENT DOCUMENTS

DE  3501952 C1  3/1991

(Continued)

OTHER PUBLICATIONS

International Search Report for International Application No. PCT/US2005/009832, mailed Aug. 11, 2006.

(Continued)

*Primary Examiner*—Isam Alsomiri
(74) *Attorney, Agent, or Firm*—Morgan, Lewis & Bockius LLP (57) ABSTRACT

A positioning system includes a device, having an antenna and a reflector with a known position proximate to the antenna, that transmits at least an electromagnetic pulse having a carrier signal frequency. The device receives a return signal over a period of time, wherein the return signal includes a return pulse from an object within a radar detection area of the device and at least one multi-path pulse. The device processes the return signal so as to isolate the return pulse and the at least one multi-path pulse from the return signal. The device determines a range from the device to the object and the position of the device relative to the object. The range is determined in accordance with a time of arrival of the return pulse and the position is determined in accordance with a time of arrival of the at least one multi-path pulse.

23 Claims, 9 Drawing Sheets

U.S. PATENT DOCUMENTS

| | | | |
|---|---|---|---|
| 4,873,449 A | 10/1989 | Paramythioti et al. | |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,483,241 A | 1/1996 | Waineo et al. | |
| 5,572,427 A | 11/1996 | Link et al. | |
| 5,610,815 A | 3/1997 | Gudat et al. | |
| 5,640,323 A | 6/1997 | Kleimenhagan et al. | |
| 5,657,226 A | 8/1997 | Shin et al. | |
| 5,657,317 A | 8/1997 | Mahany et al. | |
| 5,874,918 A | 2/1999 | Cazenecki et al. | |
| 5,933,079 A | 8/1999 | Frink | |
| 5,982,164 A | 11/1999 | Czarnecki et al. | |
| 5,986,602 A | 11/1999 | Frink | |
| 6,011,974 A | 1/2000 | Cedervall et al. | |
| 6,072,421 A | 6/2000 | Fukae et al. | |
| 6,370,207 B1 | 4/2002 | Weill et al. | |
| 6,424,264 B1 | 7/2002 | Giraldin et al. | |
| 6,427,079 B1 | 7/2002 | Schneider et al. | |
| 6,459,966 B2 | 10/2002 | Nakano et al. | |
| 6,489,917 B2 | 12/2002 | Geisheimer et al. | |
| 6,525,688 B2 | 2/2003 | Chou et al. | |
| 6,556,942 B1 | 4/2003 | Smith | |
| 6,608,593 B2 | 8/2003 | Holt | |
| 6,720,935 B2 | 4/2004 | Lamensdorf et al. | |
| 2001/0027360 A1 | 10/2001 | Nakano et al. | |
| 2001/0051527 A1 | 12/2001 | Kuwahara et al. | |
| 2003/0005030 A1 | 1/2003 | Sutton et al. | |
| 2003/0007473 A1 | 1/2003 | Strong et al. | |
| 2003/0052821 A1 | 3/2003 | Holt | 342/453 |
| 2004/0212529 A1* | 10/2004 | Fehrenbach et al. | 342/124 |

FOREIGN PATENT DOCUMENTS

| | | |
|---|---|---|
| DE | 19910715 A1 | 9/2000 |
| EP | 0325539 A1 | 7/1989 |
| EP | 0961134 A1 | 12/1999 |
| US | PCT/US2004/02136 | 12/2004 |
| WO | WO 02/052225 A2 | 7/2002 |
| WO | WO 2005/015258 A1 | 2/2005 |

OTHER PUBLICATIONS

Edelsbruneer, H., et al., "Quadratic Time Algorithm for the Minmax Length Triangulation," *Proceedings of the 32nd Annual Symposium on Foundations of Computer Science*, San Juan, Puerto Rico, 1991, pp. 414-423.

Afsar, M.N., et al., "A New Wideband Cavity-Backed Spiral Antenna," *Proceedings of the 2001 IEEE Antennas and Propogation Society Int'l Symposium*, 2001, vol. 4, pp. 124-127.

Michelson, D.G., et al., "use of Circular Polarization in a Marin Radar Positioning System," *Remote Sensing: An Economic Tool for the Nineties*, IGARSS '89, Jul. 10-14, 1999.

Hecht, E., et al., *Optics*, Addison-Wesley Publishing, Chapter 10, 1974, pp. 329-396.

Jackson, J.D., *Classical Electrodynamics*, 2nd Ed., John Wiley & Sons, Chapter 9, 1975, pp. 391-468.

\* cited by examiner

POSITIONING SYSTEM WITH INTENTIONAL MULTI-PATH SIGNAL

This application is a continuation-in-part of U.S. patent application Ser. No. 10/614,097, filed Jul. 3, 2003 now U.S. Pat. No. 7,250,901, which is hereby incorporated by reference in its entirety.

FIELD OF THE INVENTION

The present invention relates generally to positioning systems and more specifically, to a system and method for determining the position of a mobile device relative to a number of objects using one or more intentional multi-path signals.

BACKGROUND OF THE INVENTION

Local positioning systems are becoming an important enabler in mobile devices requiring navigation capabilities, especially in applications of autonomous vehicles and precision construction tools. Global positioning systems such as GPS provide only medium accuracy position information, usually no better than 10 cm, and require a clear view of the sky to near the horizon. Local positioning systems, with either active or passive components distributed in a working volume, can allow much more accurate (<1 cm) positioning, and allow the user to expand the system as necessary to operate in even the most complex enclosed geometries.

Conventional local positioning systems include acoustic and laser ranging systems. Acoustic systems typically use transponder beacons to measure range within a network of devices, some of which are fixed to form a local coordinate system. Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. However, laser systems currently employ expensive pointing mechanisms that can drive the system cost to $30K or more.

A relatively low-cost (e.g., under $2000) local positioning system able to determine 2D or 3D positions to accuracies of a few millimeters would enable a large set of potential products, in such application areas as precision indoor and outdoor construction, mining, precision fanning and stadium field mowing and treatment. The present invention overcomes the cost and accuracy limitations of conventional local positioning systems.

SUMMARY

A system and method providing a low-cost, yet highly accurate, local positioning system are provided. In one embodiment, a device, including an antenna and a reflector with a known position proximate to the antenna, transmits at least an electromagnetic pulse having a carrier signal frequency. The device receives a return signal over a period of time, wherein the return signal includes a return pulse from an object within a radar detection area of the device and at least one multi-path pulse. The device processes the return signal so as to isolate the return pulse and the at least one multi-path pulse from the return signal. The device determines a range from the device to the object and the position of the device relative to the object. The range is determined in accordance with a time of arrival of the return pulse and the position is determined in accordance with a time of arrival of the at least one multi-path pulse.

In some embodiments, the pulse transmitted is polarized and the return signal received preferentially has the same polarization.

In some embodiments, the reflector is a passive reflector. In other embodiments, the reflector is an active reflector. In some embodiments, the object is a passive reflector. In other embodiments, the object is an active landmark.

In some embodiments, the device includes a processor, a memory and at least one program module. The at least one program module is stored in the memory and executed by the processor. The at least one program module contains instructions for processing the return signal so as to isolate the return pulse and the at least one multi-path pulse from the return signal. The at least one program module also contains instructions for determining the range from the device to the object and the position of the device relative to the object. The range is determined in accordance with the time of arrival of the return pulse and the position is determined in accordance with the time of arrival of the at least one multi-path pulse.

In some embodiments, the antenna is configured to both preferentially transmit the pulse having the polarization and to preferentially receive the return signal having the polarization.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DESCRIPTION OF EMBODIMENTS

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

In general, multi-path propagation degrades a performance of communications systems, such as cellular telephone networks and wireless local area networks (WLANs), as well as positioning systems, such as the Global Positioning System (GPS). Multi-path propagation occurs when, for example, a radio frequency signal takes different paths when propagating from a transmitter to a receiver. While the signal is en route, objects, such as walls, chairs, desks and other items, cause the signal to bounce in one or more different directions. For example, a portion of the signal, known as a direct-path signal, may propagate directly to the receiver, and another part may bounce from a chair to the ceiling, and then to the receiver. As a result, some of the signal will encounter a delay and travel one or more longer paths to the receiver. This portion of the signal is known as a multi-path signal.

At the receiver, one or more multi-path signals may overlap with the direct-path signal giving rise to intersymbol interference. In communications systems, this interference may result in errors in demodulating information encoded in the signals leading to bit errors. In positioning systems, this interference may result in an error in a determined position of a device, such as a pseudo-range in GPS. As a consequence, in existing systems multi-path signals are avoided or minimized using techniques such as diversity (including two or more receive antennas at locations physically separated from one another) and multi-path mitigation (see, for example, U.S. Pat. No. 6,370,207). These approaches add complexity and expense to these existing systems.

System and method embodiments that provide a low-cost, yet highly accurate, local positioning system are provided by the embodiments of the present invention described in this document. These embodiments use multi-path signals, which are normally considered to be undesirable, in an advantageous manner. In particular, one or more multi-path signals are intentionally produced in the local positioning system. A reflector with a known position proximate to an antenna in a device produces the one or more multi-path signals. By comparing delays in a time of arrival of the one or more multi-path signals (relative to a direct-path signal) with a maximal delay corresponding to the known position of the reflector, a position of the device relative to an object within a radar detection area of the device may be determined.

Figure 1:
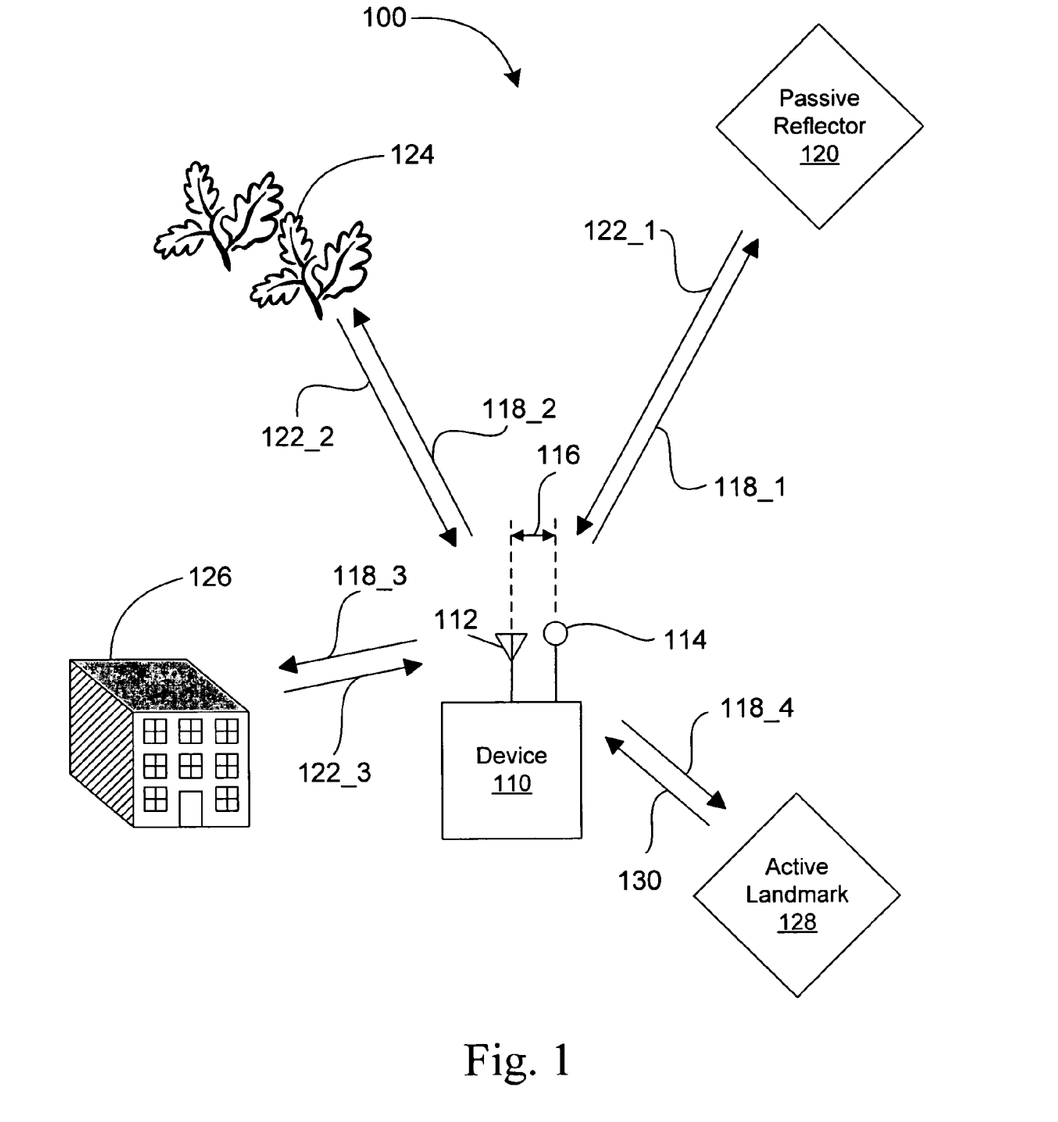
FIG. 1 is a block diagram illustrating an embodiment of a positioning system with one or more intentional multi-path signals.

FIG. 1 illustrates an embodiment 100 of the positioning system with one or more intentional multi-path signals. A device 110 is configured to transmit one or more signals 118, each of which includes at least one electromagnetic pulse having a carrier signal frequency, using at least one antenna 112. In some embodiments, the device 110 is configured to transmit one or more signals 118 having a plurality of electromagnetic pulses. In an exemplary embodiment, the pulses are 1 nanosecond (ns) in duration and have the carrier signal frequency of 6 gigahertz (GHz). A typical repetition period for the pulses is every microsecond. Other embodiments may employ pulse duration and carrier signal frequency pairings of: 1 ns and 24 GHz; 5 ns and 6 GHz; and 1 ns and 77 GHz. The increased accuracy of range estimation available from shorter pulse durations and higher carrier signal frequencies comes at the expense of increased cost and complexity of associated circuitry in some embodiments.

In some embodiments, the transmitted signals 118 are polarized. The polarization may include linear polarization, elliptical polarization, right-hand elliptical polarization, left-hand elliptical polarization, right-hand circular polarization or left-hand circular polarization.

The device 110 also includes a reflector 114 proximate to the antenna 112. The reflector 114 has a spacing 116 from the antenna 112. In an exemplary embodiment, the spacing 116 corresponds to a propagation delay from the antenna 112 to the reflector 114 of 2 ns or some 0.6 m. A portion of one or more of the transmitted signals 118 is reflected off of the reflector 114 resulting in one or more multi-path signals during transmitting. In some embodiments, the reflector 114 is a passive reflector. In other embodiments, the reflector 114 is an active reflector, in which a portion of the transmitted signals 118 is received and re-transmitted by the reflector 114. Each re-transmitted signal includes at least one electromagnetic pulse. In some embodiments, the electromagnetic pulses in the re-transmitted signals may have a second carrier signal frequency. In some embodiments, the re-transmitted signals may be modulated, using amplitude modulation or frequency modulation, and/or may be encoded. In some embodiments, the re-transmitted signals may be polarized. In some embodiments, the polarization of the re-transmitted signals may be the same as the transmitted signals 118. The active reflector may give rise to an additional time delay associated with a time between when the portion of the transmitted signals 118 is received and when it is re-transmitted. This delay can be determined in a calibration procedure and stored in the device 110. Subsequent determinations of the position of the device 110 may be corrected for this delay. Unless noted otherwise, in the exemplary embodiments in the remainder of the discussion, the reflector 114 is taken to be a passive reflector.

The signals 118, including the multi-path signals, are reflected off of one or more objects, including passive reflector 120, foliage 124 and/or building 126, within a radar detection area of the positioning system 100. For example, foliage 124, when illuminated by signal 118_2, will reflect a signal 122_2. Similarly, building 126, when illuminated by signal 118_3, will reflect a signal 122_3. Each of the return signals 122 includes at least one electromagnetic return pulse. In some embodiments, the return signals 122 include a plurality of electromagnetic return pulses. In some embodiments, the passive reflector 120 is a dihedral reflector. In some embodiments, the passive reflector 120 is a corner cube reflector.

In some embodiments, the positioning system 100 contains one or more optional active landmarks 128, in which transmitted signals 118_4 is received and re-transmitted as signal 130 by the active landmark 128. Signal 130 includes at least one electromagnetic return pulse. In some embodiments, the signal 130 includes a plurality of electromagnetic return pulses. In some embodiments, the electromagnetic return pulse in the signal 130 may have a second carrier signal frequency. In some embodiments, the signal 130 may be modulated, using amplitude modulation or frequency modulation, and/or may be encoded. In some embodiments, the signal 130 may be polarized. In some embodiments, the polarization of the signal 130 may be the same as the transmitted signal 118_4. The active landmark 128 may give rise to an additional time delay associated with a time between when the transmitted signal 118_4 is received and when the signal 130 is re-transmitted. This delay can be determined in a calibration procedure and stored in the device 110. Subsequent determinations of the position of the device 110 may be corrected for this delay.

The device 110 is further configured to receive the one or more return signals 122, and optionally signal 130 as well, over a period of time. In some embodiments, the device 110 is configured to preferentially receive return signals 122, and optionally signal 130, having the polarization of the signals 118. A portion of the return signals 122 and/or signal 130 propagates directly to the antenna 112. Another portion of the return signals 122 and/or signal 130 reflects off of reflector 114 resulting in one or more multi-path signal during receiving. The device is also configured to process the one or more return signals so as to isolate a respective direct-path return pulse in a respective return signal, such as return signal 122_1, and at least one multi-path pulse from the respective return signal.

In some embodiments of the positioning system 100, there may be two or more additional devices, such as device 110, two or more additional passive reflectors, such as passive reflector 120, and/or two or more active landmarks, such as active landmark 128. In some embodiments, positions of the passive reflector 120 and/or active landmark 128 may be fixed. In other embodiments, an average position of the passive reflector 120 and/or active landmark 128 may be fixed. The passive reflector 120 and/or active landmark 128 may be placed at surveyed locations. Alternately, the passive reflector 120 and/or active landmark 128 may be placed at arbitrary positions that are automatically determined during an initial system self-calibration procedure and stored, for example, in the device 110. In either case, the position of device 110 is determined relative to the position of one or more passive reflectors, such as passive reflector 120, and/or active landmarks, such as active landmark 128, by determining one or more ranges. Each range relates to a distance between the device 110 and the passive reflector 120 or the active landmark 128.

The range from the device 110 to a respective object, such as passive reflector 120, is determined in accordance with a time of arrival of the corresponding direct-path return pulse. For the respective object some distance r away from the device 110, the time of arrival (ToA) is $$ToA = 2\frac{r}{c}, \quad \text{(Equation 1)}$$

where c is a propagation speed of electromagnetic signals. The propagation speed of electromagnetic signals, c, is known to be approximately $3.0*10^8$ m/s in a vacuum. In typical atmospheric conditions, the propagation speed of electromagnetic signals deviates from this value by less than 300 ppm (parts per million). By employing information about altitude and other environmental factors, the propagation speed of electromagnetic signals in an environment of the positioning system 100 can be determined to within 100 ppm. As noted previously, for return pulses from the optional active landmark 128 and/or the active reflector (in embodiments where the reflector 114 is an active reflector) there may be an additional delay Δ associated with the processing of signals in the active landmark 128 and/or the active reflector. A modified expression for the time of arrival, for use with an active landmark 128, is $$ToA = 2\frac{r}{c} + \Delta. \quad \text{(Equation 2)}$$

The delay Δ may not be the same for all active landmarks and/or all active reflectors. By correcting the time of arrival for the delay Δ, the range from the device 110 to the respective object may be accurately determined.

As discussed below, the additional intentional multi-path signals during transmitting and receiving in the positioning system 100 provide additional information that allows an angle corresponding to the respective object, such as passive reflector 120, to be determined. The angle and the range between the device 110 and the respective object define the position of the device 110 relative to the respective object.

In some embodiments, this position information is sufficient to unambiguously determine the position of the device 110. In other embodiments, more than one passive reflector 120 and/or more than one active landmark 128 may be used. For example, if the positions of a combination of three passive reflectors and/or active landmarks that are not collinear are known, e.g., by surveying them in advance, and the device 110 and the passive reflectors and/or active landmarks are located substantially within a two-dimensional plane, it is possible to determine the position of the device 110 unambiguously from knowledge of the range from the device 110 to each of the passive reflectors and/or active landmarks. Alternatively, if the active landmarks 112 are not coplanar, the use of a combination of four passive reflectors and/or active landmarks with known positions will allow the unambiguous determination of the position of the device 110 from knowledge of the range from the device 110 to each of the passive reflectors and/or active landmarks. Algorithms for the determination of position based on one or more ranges are well-known to one of skill in the art. See, for example "Quadratic time algorithm for the minmax length triangulation," H. Edelsbruneer and T. S. Tan, pp. 414-423 in *Proceedings of the 32nd Annual Symposium on Foundations of Computer Science*, 1991, San Juan, Puerto Rico, hereby incorporated by reference in its entirety.

Figure 2:
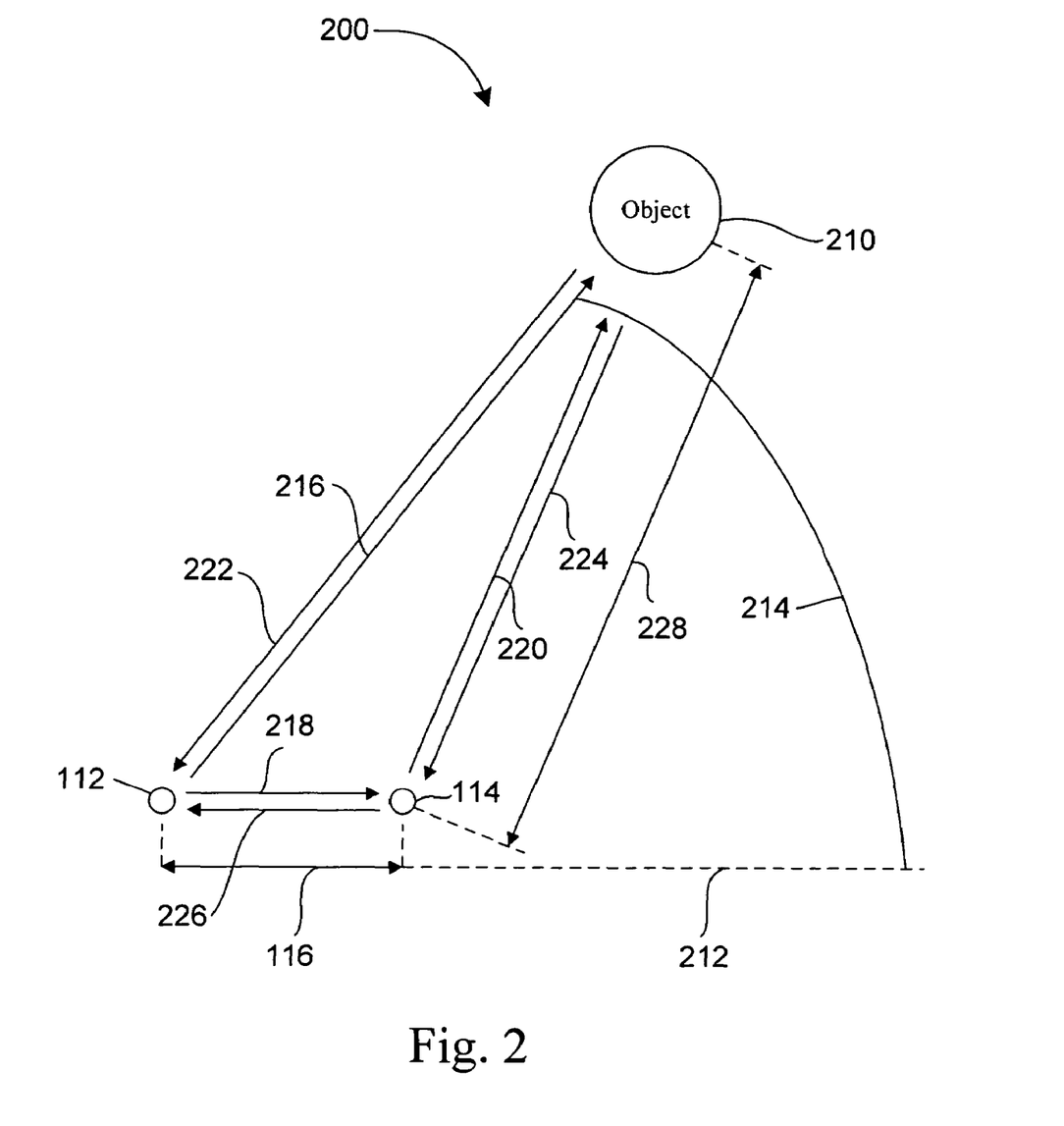
FIG. 2 is a block diagram illustrating an embodiment of the positioning system.

FIG. 2 illustrates an embodiment 200 of the positioning system with one or more intentional multi-path signals. Object 210 is at the position with an angle 214 with respect to a line 212 and a direction, such as direction 216, between the antenna 112 (and thus the device 110 in FIG. 1) and the object 210. The antenna 112 transmits a direct-path signal, including at least one electromagnetic pulse having the carrier signal frequency, along the direction 216. The antenna also transmits a signal, including at least one electromagnetic pulse having the carrier signal frequency, along direction 218. The reflector 114 will reflect a first return multi-path signal, including at least one electromagnetic multi-path pulse, along direction 226. A total propagation time for this first return multi-path signal is sufficiently short that, for purposes of determining the position of the object 210, the first return multi-path pulse may be ignored. The reflector 114 will also reflect a multi-path signal along direction 220.

The direct-path signal propagating along the direction 216 will reflect off of the object 210. There will be a direct-path signal, including at least one electromagnetic return pulse, propagating along direction 222. There will also be a multi-path signal propagating along direction 224. This multi-path signal will reflect off of the reflector 114 producing a second return multi-path signal, including at least one electromagnetic multi-path pulse, along direction 226.

The multi-path signal propagating along the direction 220 will reflect off of the object 210 producing a third return multi-path signal, including at least one electromagnetic multi-path pulse, along the direction 222. In addition, there will be a multi-path signal propagating along the direction 224. This multi-path signal will reflect off of the reflector 114 producing a fourth return multi-path signal, including at least one electromagnetic multi-path pulse, along the direction 226. Note that higher-order reflections producing multi-path signals are neglected in this discussion.

The return signal received by the device will include the return signal along the direction 222, the second return multi-path signal along the direction 226, the third return multi-path signal along the direction 222 and the fourth return multi-path signal along the direction 226. Note that the total propagation time for second return multi-path signal and the third return multi-path signal are the same. As a consequence, the multi-path pulses in these signals will substantially overlap one another.

Figure 3A:
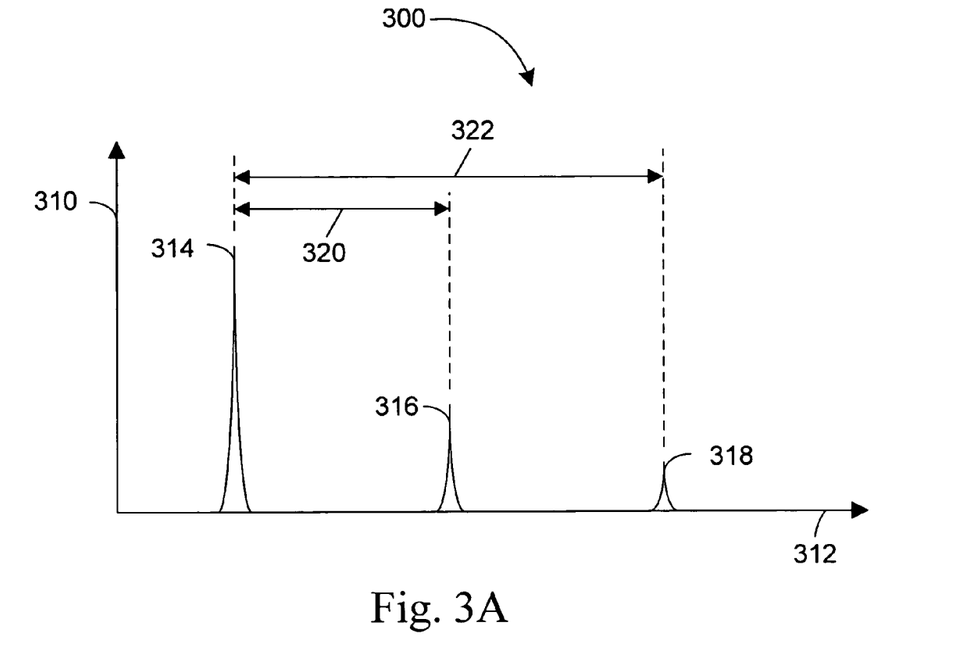
FIG. 3A is a diagram illustrating time of arrival of direct-path and multi-path signals in an embodiment of the positioning system.
Figure 3B:
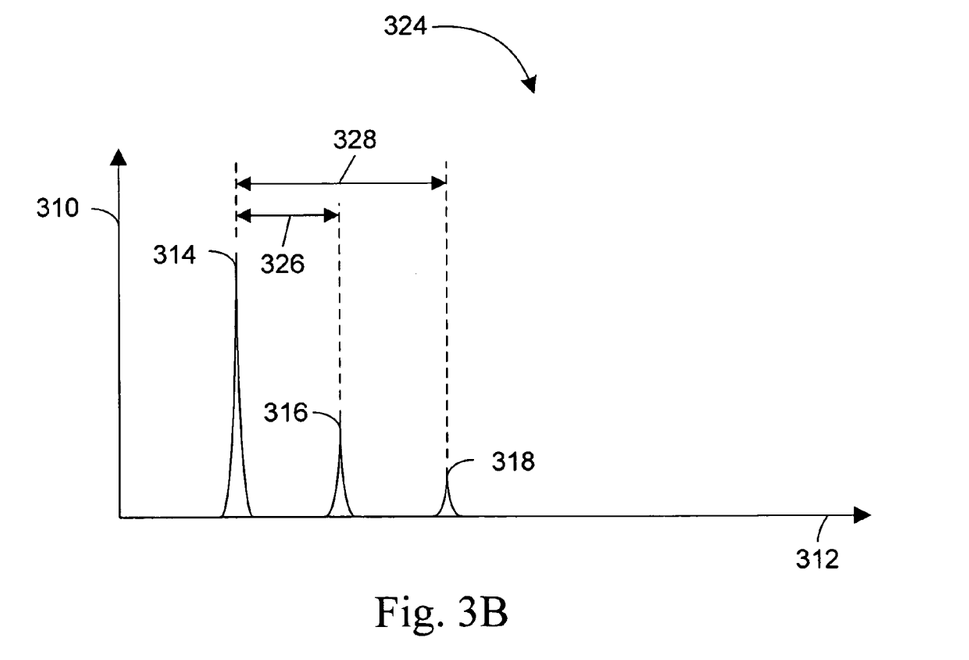
FIG. 3B is a diagram illustrating time of arrival of direct-path and multi-path signals in an embodiment of the positioning system.

For a respective angle 214, return signal 300 at the device 110 (FIG. 1) is shown in FIG. 3A as magnitude 310 as a function of time 312. The return signal 300 includes a pulse 314 corresponding to the direct-path return signal, a pulse 316 corresponding to overlapping multi-path pulses in the second return multi-path signal and the third return multi-path signal, and a pulse 318 corresponding to the fourth return multi-path signal. The pulses 316 have a delay 320 with respect to the pulse 314 and the pulse 318 has a delay 322 with respect to the pulse 314. As the angle 214 (FIG. 2) approaches 0° or 180°, delays 320 and 322 will decrease and approach zero. This is illustrated in FIG. 3B by delay 326 and delay 328 between pulses in return signal 324. For values of the angle 214 (FIG. 2) substantially not equal to 0° and 180°, the intentional multi-path signals provide additional information to allow the position of the device 110 (FIG. 1) to be determined.

Referring back to FIG. 2, when the angle 214 equals 0° or 180° the return pulse and the multi-path pulses in the return signal will overlap. To prevent a total loss of signal, a cross section or gain profile of the reflector 114 is chosen such that an amplitude of a respective multi-path signal reflected off of the reflector 114 is less than an amplitude of the direct-path signal. In an exemplary embodiment, the amplitude of the respective multi-path signal reflected off of the reflector 114 is less than half the amplitude of the direct-path signal (thereby ensuring that the return pulse has a peak amplitude in a respective return signal, such as return signal 300 in FIG. 3A). This corresponds to at least a four-fold reduction in power from pulse 314 to pulse 316. In an exemplary embodiment, the reflector 114 is spherical in shape and is coated with a metal, such as gold, having suitable conductivity (and, thus, a skin depth) for carrier signal frequencies in the microwave region. In another exemplary embodiment, the reflector 114 has the shape of a pyramid and is coated with the metal. In yet another exemplary embodiment, the appropriate cross section of the reflector 114 is determined by a surface area of the reflector 114.

Since the position of the reflector 114, including the spacing 116, relative to the antenna 112 is known, the delays, such as delay 320 (FIG. 3A), between the multi-path pulses, such as pulses 316 and 318 (FIG. 3A), and the return pulse, such as return pulse 314 (FIG. 3A), allow the angle 214 to be determined. In particular, as described previously the time of arrival of the return pulse 316 allows the range between the object 210 and the device 110 (FIG. 1) to be determined. The delays, such as delay 320 (FIG. 3A), allow the additional path-length corresponding to a sum of the spacing 116 and a spacing 228. Since the spacing 116 is known, this allows the spacing 228 to be determined. The range, the spacing 116 and the spacing 228 allow the angle 214 to be determined. Thus, the position of the device 110 (FIG. 1) relative to the respective object may be determined in accordance with the time of arrival of one or more multi-path pulses.

For example, if the spacing 116 corresponds to a propagation delay between the antenna 112 and the reflector 114 of 3 ns and the range between the object 210 and the antenna 112 corresponds to 4 ns, for the angle 214 equal to 90° the spacing 228 corresponds to 5 ns (using the Pythagorean theorem), the delay 320 (FIG. 3) is 4 ns and the delay 322 (FIG. 3) is 8 ns. If the spacing 116 corresponds to a propagation delay between the antenna 112 and the reflector 114 of 3 ns and the range between the object 210 and the antenna 112 corresponds to 4 ns, for the angle 214 equal to 45° the spacing 218 corresponds to 2.8336 ns (using the Law of Cosines) and the delay 320 (FIG. 3) is 1.8336 ns and the delay 322 (FIG. 3) is 3.6672 ns.

The preceding calculation of the angle 214 is for illustrative purposes only. There are other more efficient calculation procedures. Since the delays, such as delay 320 (FIG. 3A), are a function of the angle 214, for a known spacing 116 (FIG. 1) delays corresponding to different values of the angle 214 can be tabulated. Measured delays and, given a known gain profile for the reflector 114, pulse amplitudes can be used to look-up the corresponding value of the angle 214.

Figure 4:
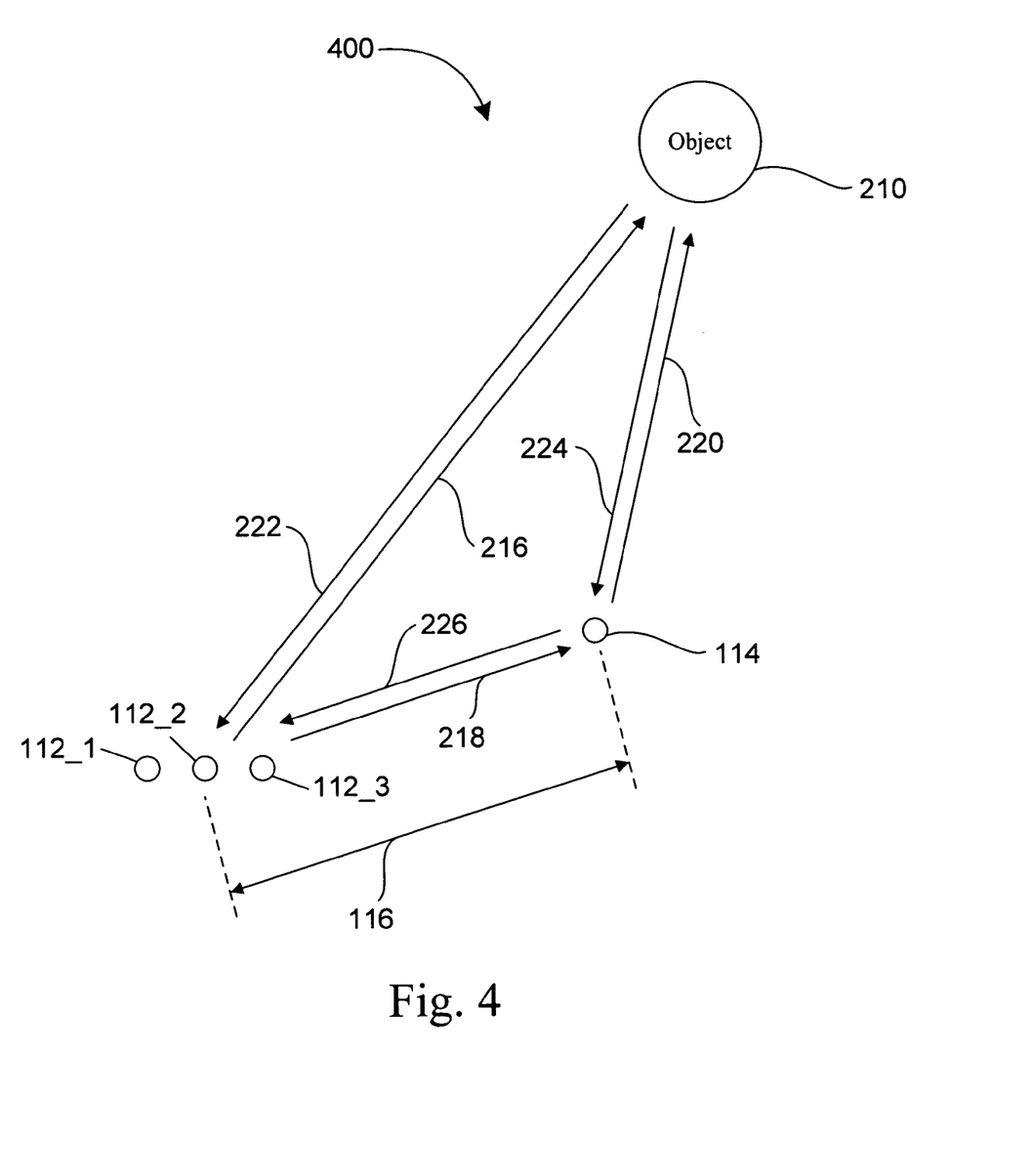
FIG. 4 is a block diagram illustrating an embodiment of the positioning system.

FIG. 4 illustrates an alternative embodiment 400 of the positioning system with one or more intentional multi-path signals. The positioning system 400 has a plurality of antennas 112 and the reflector 114 is not collinear with the antennas 112. In an exemplary embodiment, the reflector 114 is at an angle (not shown) of 10-15° from collinear. This embodiment 400 is less susceptible to the previously discussed challenge when the angle 214 (FIG. 2) is substantially equal to 0° and 180°.

Figure 5A:
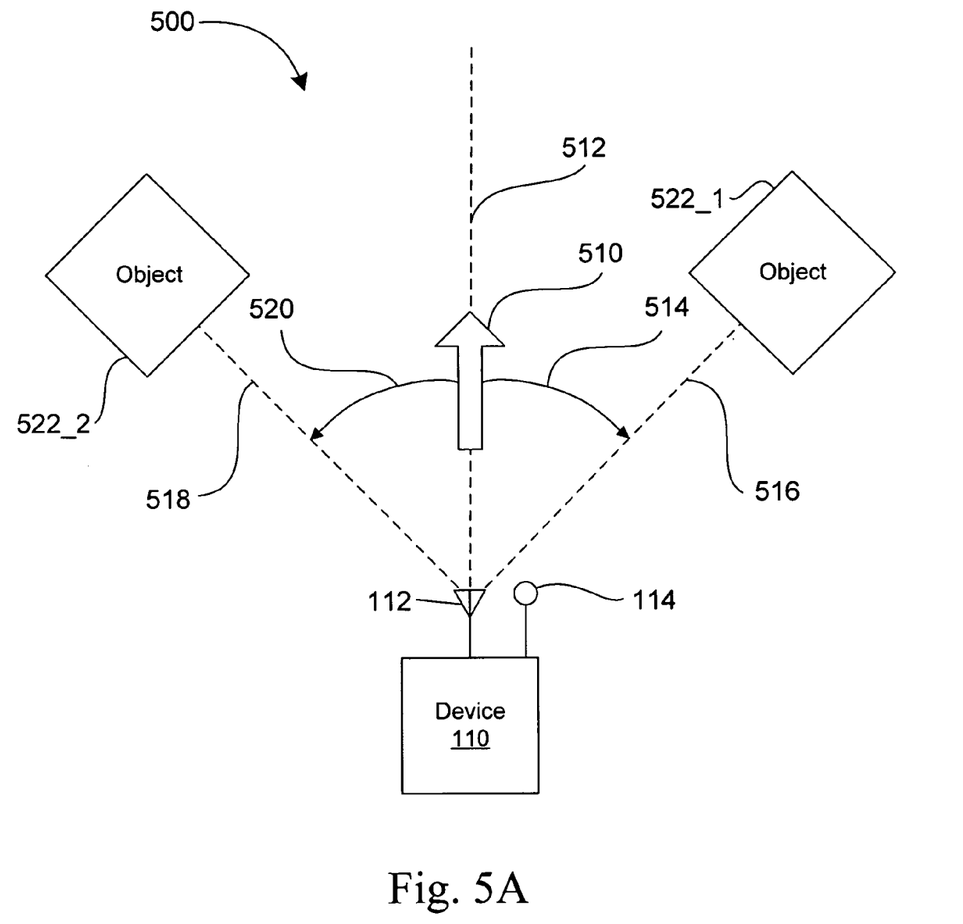
FIG. 5A is a block diagram illustrating an embodiment of the positioning system.

Another potential solution to the challenge when the angle 214 (FIG. 2) is substantially equal to 0° and 180° is to combine position information from the positioning system with one or more intentional multi-path signals with additional position information provided by synthetic aperture radar (SAR). This is illustrated in FIG. 5A. In addition to determining the range from the device 110 to one or more objects 522, each of which may be a passive reflector 120 (FIG. 1), in the local positioning system 500 the device 110 moves with a velocity v 510 in a particular direction 512 and transmits one or more signals 118 (FIG. 1), each of which includes at least one electromagnetic pulse having the carrier signal frequency.

Figure 5B:
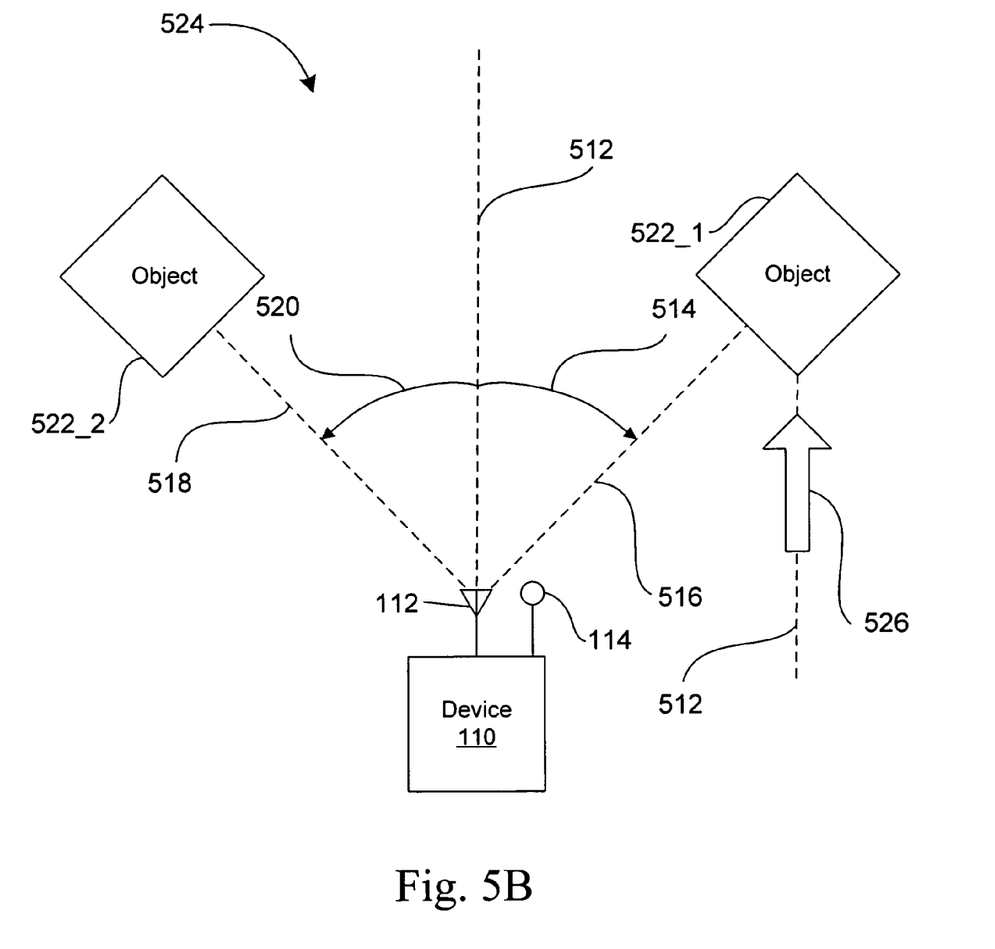
FIG. 5B is a block diagram illustrating an embodiment of the positioning system.

The device 110 receives one or more return signals 122 (FIG. 1) over a period of time. Return pulses and multi-path pulses from the respective object, such as object 522_1, received by the device 110 will be Doppler shifted in frequency, in accordance with $$f = f_c\left(1 + \frac{v}{c}\cos(\theta)\right), \quad \text{(Equation 3)}$$

where $f_c$ is the carrier signal frequency, $f$ is the received carrier signal frequency of the return pulse and the one or more multi-path pulses as received by the device 110, c is the propagation speed of electromagnetic signals in an atmosphere that fills the environment between the device 110 and the object 522_1, and θ is an angle 514 between the direction 512 of device movement and the straight line 516 between the device 110 and the object 522_1. (Note that the angle θ 514 is a complement of the angle 214 in FIG. 2.) If the velocity v 510 of the device 110 or at least the magnitude of the velocity of the device 110 is known, the angle θ 514 can be determined from the received carrier signal frequency of one or more return pulses and/or one or more return multipath pulses. Note that for a respective received carrier signal frequency $f$, however, there are at least two angles that satisfy Equation 3. This is so because, for any angle $\theta_0$ that solves Equation 3, the angle $-\theta_0$ also solves Equation 3. In FIG. 5A, these two angles correspond to the angle $\theta$ 514 between direction 512 and line 516 between the device 110 and the object 522_1, and the angle $-\theta$ 520 between direction 512 and line 518. As shown in FIG. 5B, in some embodiments, such as embodiment 524, the object 522_1 moves with a velocity v 526 in a particular direction 512 about an average fixed position allowing the angle $\theta$ 514 to be determined from the resulting Doppler shift. Note that in these embodiments the Doppler shift provides information about the complement to the angle $\theta$ 514, i.e., the angle 214 (FIG. 2).

Figure 6:
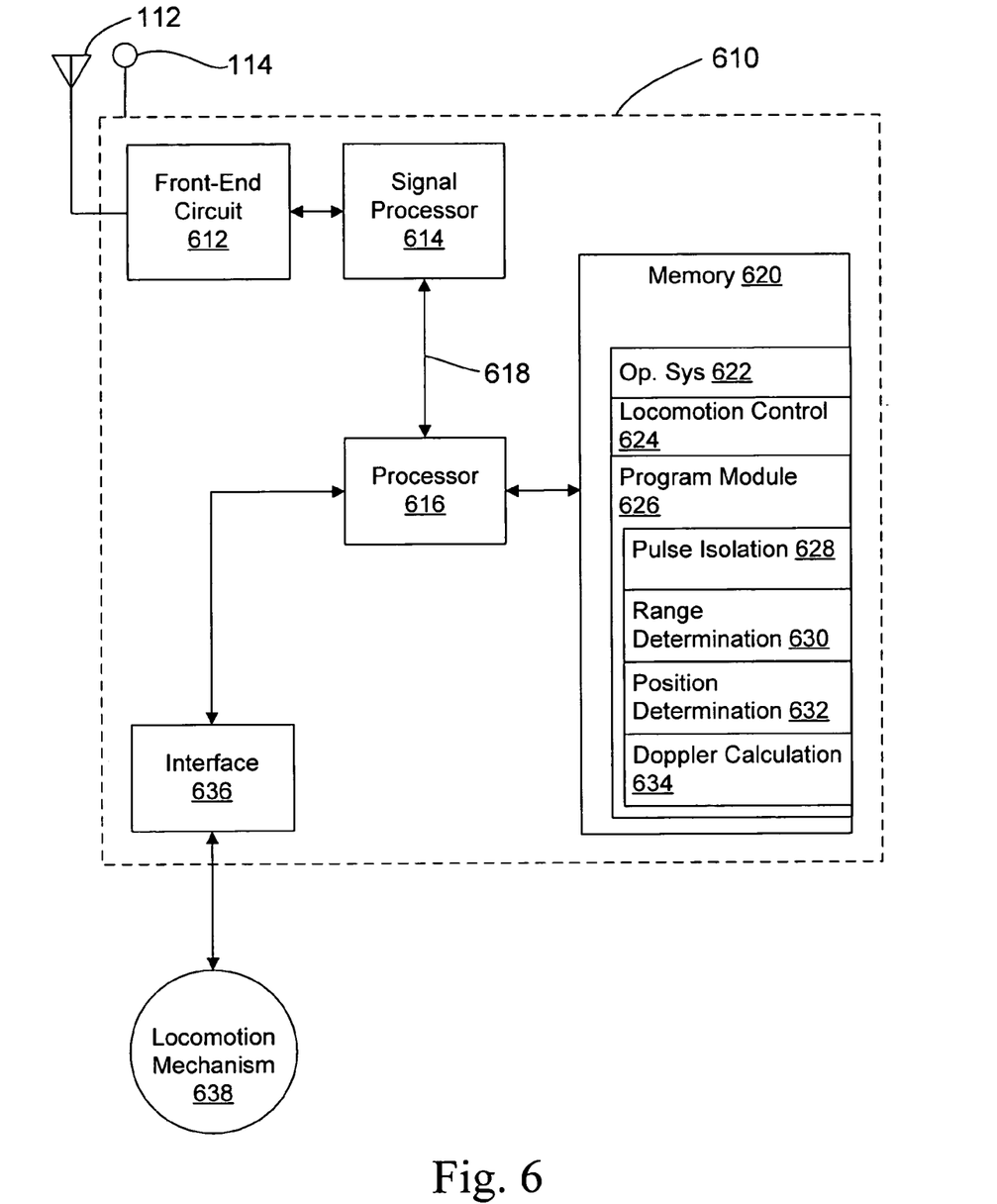
FIG. 6 is a block diagram illustrating components in a typical device in an embodiment of the positioning system.

FIG. 6 is an illustration of components in a typical device 610, such as device 110 (FIG. 1), in an embodiment of the positioning system. The device includes at least one antenna 112 and at least one reflector 114. In some embodiments, the device 610 may include at least one circularly polarized antenna. In some embodiments, the device 610 may include at least one linearly polarized antenna. In some embodiments, the device 610 may include at least one polarizing antenna that is used to transmit and to receive. In some embodiments, the antenna 112 may be a bi-cone, a bi-cone with a ground plane, a helix, horizontal omni-directional, omni-directional, hemi-directional or isotropic.

The device 610 includes a front-end circuit 612 and a signal processor 614 for modifying one or more signals. The modifying may include amplification, filtering and/or removal of modulation coding. The device 610 includes one or more processing units (CPUs) 616, memory 620, and one or more communications buses 618 for connecting these components. The device 610 may include an optional electromechanical interface 636 and an optional locomotion mechanism 638 for moving the device 610 in a particular direction, at a velocity. In alternate embodiments, some or all of the functionality of the device 610 may be implemented in one or more application specific integrated circuits (ASICs), thereby either eliminating the need for the processing unit 616 or reducing the role of the processing unit 616. Memory 620 may include high speed random access memory and may also include non-volatile memory, such as one or more magnetic disk storage devices. Memory 620 may include mass storage that is remotely located from the processing unit 620.

Memory 620 stores an operating system 622 that includes procedures for handling various basic system services for performing hardware dependent tasks. Memory 620 may store an optional locomotion control program module 624. Memory 620 also stores one or more program modules 626. The program module 626 contains instructions for transmitting one or more signals including at least the electromagnetic pulse having the carrier signal frequency from the device 610 and receiving one or more return signals over the period of time. The program module 626 includes a pulse isolation module 628 to isolate the return pulse and one or more multi-path pulses from the one or more return signals. The program module 626 also includes a range determination module 630 and a position determination module 632. The program module 626 may optionally include a Doppler calculation module 634.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments.

The modules or sets of instructions in memory 620 are executed by the processing unit 616. In addition, the device 610 may include executable procedures (such as a time delay correction calculation for one or more active landmarks and embodiments with an active reflector such as the reflector 114 in FIG. 1), sub-modules, tables and other data structures (not shown) including, for example, positions of one or more passive reflectors 120 (FIG. 1), active landmarks 128 (FIG. 1) and/or the time delays corresponding to one or more active landmarks and/or active reflectors. In some embodiments, additional or different modules and data structures may be used and some of the modules and/or data structures listed above may not be used. In some embodiments, the capabilities of the device 610 may be implemented more in hardware and less in software, or less in hardware and more in software, as is known in the art.

Figure 7:
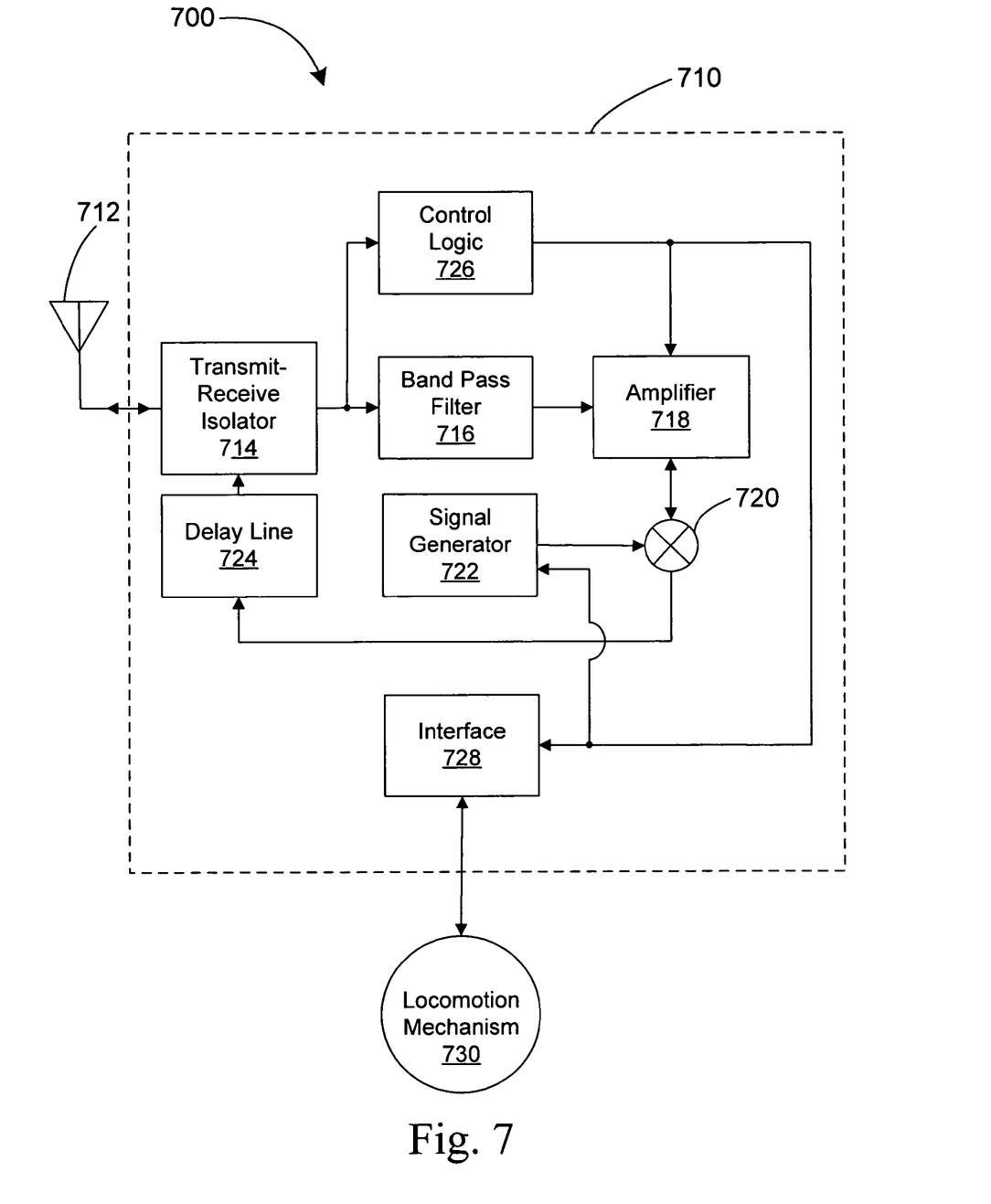
FIG. 7 is a block diagram illustrating components in a typical active landmark in an embodiment of the positioning system.

Referring to FIG. 7, an active landmark 710, such as active landmark 128 (FIG. 1), in an embodiment of a local positioning system 700 includes at least one antenna 712 for receiving electromagnetic pulses and re-transmitting pulses. The active landmark 710 also includes a transmit-receive isolator 714, an optional band pass filter 716 and an amplifier 718. The active landmark 710 includes a modulator 720, such as a mixer, a signal generator 722 and a control logic 726. The active landmark 710 may include an optional delay line 724. The active landmark 710 may also include an optional electromechanical interface circuit 728 and an optional locomotion mechanism 730, for moving the active landmark 710 in a particular direction, at a velocity.

In some embodiments, the active landmark 710 is stationary. A receive signal corresponding to a pulse transmitted by the device 610 (FIG. 6) is received using the antenna 712. If the pulse is transmitted by the device 610 (FIG. 6) has a polarization, the antenna 712 may preferentially receive signals having the polarization. The receive signal is passed through the transmit-receive isolator 714 to isolate transmit and receive circuitry, the optional band pass filter 716 to band limit the receive signal and the amplifier 718 to amplify the receive signal. In some embodiments, the receive signal is modulated or encoded in the modulator 720 with a modulating or encoding signal generated by the signal generator 722 to produce a transmit modulated signal. Modulation may be amplitude modulation or frequency modulation. The transmit modulated signal is passed through an optional delay line 724 and the transmit-receive isolator 714 to the antenna 712 that transmits a return electromagnetic modulated pulse corresponding to the transmit modulated signal.

In some embodiments, the transmit-receive isolator 714 is a transmit receive switch. In other embodiments, the transmit-receive isolator 714 is a grating and the delay line 724 modifies the phase of the transmit modulated signal such that the grating routes the transmit modulated signal to the antenna 712. In other embodiments, the active landmark 710 includes a removable energy source such as a battery (not shown).

In other embodiments, the active landmark 710 has separate receive and transmit antennas, each having the polarization of the pulse transmitted by the device 610 (FIG. 6), and the transmit-receive isolator 714 and the delay line 724 are not included.

In some embodiments, the modulating signal generated by the signal generator 722 may be programmed, thereby changing the modulating signal or encoding of the modulating signal. Control information corresponding to the modification of the signal generator 722 may be encoded in the pulse transmitted by the device 610 (FIG. 6). Alternatively, the control information may be transmitted in a separate wireless signal between the device 610 (FIG. 6) to the active landmark 710. The control logic 726 identifies this control information and modifies settings in the signal generator 722 based on these instructions.

In some embodiments, the active landmark 710 is moveable about an average fixed location. The control logic 726 implements this capability by signaling interface 728, which in turn activates locomotion mechanism 730. In some embodiments, mechanism 730 includes an electric motor, the speed of which is controlled by the level of a DC voltage provided by the interface 728. In some embodiments, the control logic 726 performs this function in response to command signals from the device 610 (FIG. 6) encoded in the transmitted pulse from the device 610 (FIG. 6) or in a separate wireless link. In order for the device 610 (FIG. 6) to determine angular information from the resulting Doppler shifts in the return pulse and/or the multi-path pulse, the device 610 (FIG. 6) will need to know the direction 512 (FIG. 5B) in which the active landmark 710 is moving as well as the velocity v 526 (FIG. 5B).

Figure 8:
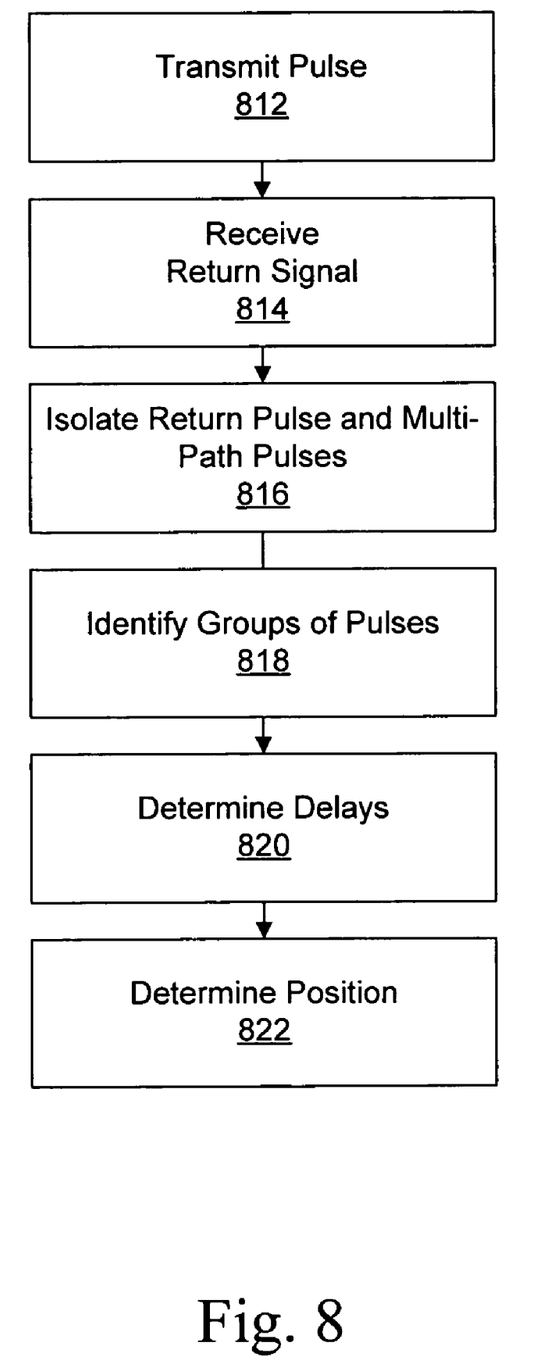
FIG. 8 is a flow chart illustrating operations in an embodiment of a procedure using one or more intentional multi-path signals.

FIG. 8 is a flow chart illustrating an embodiment of the operations in the positioning system with one or more intentional multi-path signals. A signal, including one or more pulses having the carrier frequency, is transmitted 812. In some embodiments, the transmitted signal 812 has a particular polarization. A return signal, including the return pulse and one or more multi-path pulses, is received 814 over the period of time. In some embodiments, the return signal received 814 preferentially has the polarization. The return pulse and one or more multi-path pulses are isolated 816 from the return signal. Groups of pulses are identified 818. In embodiments where the angle 214 (FIG. 2) is not substantially equal to 0° or 180°, there will typically be three pulses in a respective group. Delays between the pulses in the respective group are determined 820. The position of the device 110 (FIG. 1) relative to the respective object, such as the passive reflector 120 (FIG. 1), is determined 822.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed is:

1. A method of determining the position of a device, comprising:
   transmitting at least an electromagnetic pulse having a carrier signal frequency from the device;
   receiving a return signal over a period of time, wherein the return signal includes a return pulse from an object within a radar detection area of the device and at least one multi-path pulse associated with a reflector at a known position relative to and proximate to the device;
   wherein the at least one multi-path pulse comprises at least one pulse that has been generated by both the object and the reflector; and
   processing the return signal so as to isolate the return pulse and the at least one multi-path pulse from the return signal and to determine a range from the device to the object and the position of the device relative to the object, including determining the range in accordance with a time of arrival of the return pulse and determining the position in accordance with a time of arrival of the at least one multi-path pulse.

2. The method of claim 1, wherein the pulse during transmitting is polarized and the receiving preferentially receives the return signal having the polarization.

3. The method of claim 2, wherein the polarization is selected from the group consisting of linear polarization, elliptical polarization, right-hand elliptical polarization, left-hand elliptical polarization, right-hand circular polarization and left-hand circular polarization.

4. The method of claim 1, further comprising using a same polarized antenna for both the transmitting and receiving.

5. The method of claim 1, wherein the object is a passive reflector.

6. The method of claim 1, wherein the object is an active landmark.

7. The method of claim 1, wherein the reflector is an active reflector.

8. The method of claim 1, wherein the reflector is a passive reflector.

9. The method of claim 1, further comprising:
   moving the device at a velocity in a particular direction while performing the receiving;
   detecting a Doppler shift in the return pulse in the return signal; and
   determining an angle between the particular direction and a straight line between the device and the object in accordance with the detected Doppler shift.

10. A positioning system, comprising a device, including an antenna and a reflector with a known position relative to and proximate to the antenna, configured to transmit at least an electromagnetic pulse having a carrier frequency, to receive a return signal over a period of time in a receiver, the return signal including a return pulse from an object within a radar detection area of the device and at least one multi-path pulse associated with the reflector, wherein the at least one multi-path pulse comprises at least one pulse that has been generated by both the object and the reflector, to process the return signal so as to isolate the return pulse and the at least one multi-path pulse from the return signal, and to determine a range from the device to the object and a position of the device relative to the object,
   wherein the range is determined in accordance with a time of arrival of the return pulse and the position is determined in accordance with a time of arrival of the at least one multi-path pulse.

11. The system of claim 10, wherein the transmitted pulse is polarized and the device is configured to preferentially receive the return signal having the polarization.

12. The system of claim 11, wherein the polarization is selected from the group consisting of linear polarization, elliptical polarization, right-hand elliptical polarization, left-hand elliptical polarization, right-hand circular polarization and left-hand circular polarization.

13. The system of claim 10, wherein the antenna is configured to both preferentially transmit the pulse having the polarization and to preferentially receive the return signal having the polarization.

14. The system of claim 10, wherein the antenna is selected from the group consisting of linearly polarized and circularly polarized.

15. The system of claim 10, wherein the antenna is selected from the group consisting of a bi-cone, a bi-cone with a ground plane, a helix, horizontal omni-directional, omni-directional, hemi-directional and isotropic.

16. The system of claim 10, the device further including:
a processor;
a memory; and
at least one program module, stored in the memory and executed by the processor, the at least one program module containing instructions for:
processing the return signal so as to isolate the return pulse and the at least one multi-path pulse from the return signal; and
determining the range from the device to the object and the position of the device relative to the object;
wherein the range is determined in accordance with the time of arrival of the return pulse and the position is determined in accordance with the time of arrival of the at least one multi-path pulse.

17. The system of claim 10, the device further including:
a vehicle locomotion mechanism for moving the device in a particular direction, at a velocity;
a processor;
a memory; and
at least one program module, stored in the memory and executed by the processor, the at least one program module containing instructions for:
detecting a Doppler shift in the return pulse in the return signal; and
determining an angle between the particular direction and a straight line between the device and the object in accordance with the detected Doppler shift.

18. The system of claim 10, the object further including a mechanism for moving the object in a particular direction, at a velocity; and
the device includes:
a processor;
a memory; and
at least one program module, stored in the memory and executed by the processor, the at least one program module containing instructions for:
detecting a Doppler shift in the return pulse in the return signal; and
determining an angle between the particular direction and a straight line between the device and the object in accordance with the detected Doppler shift.

19. The system of claim 10, wherein the object is a passive reflector.

20. The system of claim 10, wherein the object is an active landmark.

21. The system of claim 10, wherein the reflector is an active reflector.

22. The system of claim 10, wherein the reflector is a passive reflector.

23. A positioning system, including device means comprising transmit means for transmitting at least an electromagnetic pulse having a carrier frequency, reflect means at a known position relative to and proximate to the transmit means for generating at least one multi-path electromagnetic pulse, and receive means for receiving a return signal over a period of time, the return signal including a return pulse from an object within a radar detection area of the device means and at least one multi-path pulse produced by the device means, wherein the at least one multi-path pulse comprises at least one pulse that has been generated by both the object and the reflect means, signal processing means for processing the return signal so as to isolate the return pulse and the at least one multi-path pulse from the return signal, and range determination means to determine a range from the device means to the object and a position of the device means relative to the object,
wherein the range is determined in accordance with a time of arrival of the return pulse and the position is determined in accordance with a time of arrival of the at least one multi-path pulse.

* * * * *